US010172140B2

(12) United States Patent
Thurfjell et al.

(10) Patent No.: US 10,172,140 B2
(45) Date of Patent: Jan. 1, 2019

(54) METHOD AND RADIO NETWORK FOR MANAGING PRECODER REPORTS

(71) Applicant: Telefonaktiebolaget LM Ericsson (publ), Stockholm (SE)

(72) Inventors: Magnus Thurfjell, Luleå (SE); Kjell Larsson, Luleå (SE); Peter Ökvist, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/528,173

(22) PCT Filed: Nov. 20, 2014

(86) PCT No.: PCT/SE2014/051391
§ 371 (c)(1),
(2) Date: May 19, 2017

(87) PCT Pub. No.: WO2016/080879
PCT Pub. Date: May 26, 2016

(65) Prior Publication Data
US 2017/0325212 A1 Nov. 9, 2017

(51) Int. Cl.
*H04W 72/00* (2009.01)
*H04W 72/04* (2009.01)
(Continued)

(52) U.S. Cl.
CPC ........ *H04W 72/048* (2013.01); *H04B 7/0456* (2013.01); *H04B 7/0617* (2013.01);
(Continued)

(58) Field of Classification Search
CPC ............. H04W 72/048; H04W 64/006; H04W 72/0413; H04L 5/0014; H04B 7/0628; H04B 7/0617
(Continued)

(56) References Cited

U.S. PATENT DOCUMENTS

2014/0204841 A1\* 7/2014 Ruiz Delgado ...... H04B 7/0689
370/328

FOREIGN PATENT DOCUMENTS

| EP | 2 747 327 | 6/2014 |
| WO | WO 2013 174442 | 11/2013 |
| WO | WO 2014 077809 | 5/2014 |

OTHER PUBLICATIONS

International Search Report for International application No. PCT/SE2014/051391—dated Sep. 11, 2015.
(Continued)

*Primary Examiner* — Marcos Batista
(74) *Attorney, Agent, or Firm* — Sage Patent Group

(57) ABSTRACT

A method and a radio network node (110) for managing precoder reports from a set of user equipments (120) are disclosed. Each of the precoder reports indicates a precoder selected, by a respective user equipment (121, 122, 123) of the set of user equipments (120), to be used by the radio network node (110) for transmission to the respective user equipment (121, 122, 123). The radio network node (110) receives (202), in a first time interval, a first set of precoder reports from the set of user equipments (120). The radio network node (110) receives (204), in a second time interval, a second set of precoder reports from the set of user equipments (120). The radio network node (110) determines (209) a first distribution of precoders for the set of user equipments and a second distribution of precoders for the set of user equipments, wherein the precoders in the first distribution are indicated by the first set of precoder reports and the precoders in the second distribution are indicated by the second set of precoder reports, whereby a change in distribution of precoders for the set of user equipments (120) is detected. A corresponding computer program and a carrier therefor are also disclosed.

6 Claims, 4 Drawing Sheets

(51) Int. Cl.
*H04W 16/28* (2009.01)
*H04W 64/00* (2009.01)
*H04B 7/0456* (2017.01)
*H04B 7/06* (2006.01)
*H04L 5/00* (2006.01)

(52) U.S. Cl.
CPC ......... *H04B 7/0619* (2013.01); *H04B 7/0628* (2013.01); *H04L 5/0014* (2013.01); *H04W 16/28* (2013.01); *H04W 64/00* (2013.01); *H04W 64/006* (2013.01); *H04W 72/0413* (2013.01)

(58) Field of Classification Search
USPC .................................... 455/452.1; 370/338
See application file for complete search history.

(56) References Cited

OTHER PUBLICATIONS

PCT Written Opinion of the International Searching Authority for International application No. PCT/SE2014/051391—dated Sep. 11, 2015.

\* cited by examiner

METHOD AND RADIO NETWORK FOR MANAGING PRECODER REPORTS

PRIORITY

This nonprovisional application is a U.S. National Stage Filing under 35 U.S.C. § 371 of International Patent Application Serial No. PCT/SE2014/051391 filed Nov. 20, 2014, and entitled "Method And Radio Network Node For Managing Precoder Reports."

TECHNICAL FIELD

Embodiments herein relate to wireless communication systems, such as cellular radio system. In particular, a method and a radio network node for managing precoder reports from a set of user equipments are disclosed. Moreover, a corresponding computer program and a carrier therefor are disclosed.

BACKGROUND

In a cellular radio system, radio signals from multiple antennas of the cellular radio system can be coordinated to amplify the radio transmission in a desired direction, i.e. typically towards specific receivers, such as mobile phones, user equipments or the like. The coordination of the radio signals is achieved by applying different phase shifts to electrical signals fed to each of the multiple antennas, each of which generate a respective radio signal. In this manner, a resulting radio signal, i.e. the radio transmission, is generated by constructive interference between the respective radio signals.

The phase shift is given by a so called precoder, or precoder index. In a known example, a base station of the cellular radio system can rely on that the mobile phones report a preferred precoder. Each mobile phone can estimate the preferred precoder by measuring on pilot signals from the base station. The pilot signals, or reference signals, are known to the mobile phones. This means for example that each transmit antenna sends a known pilot signal in a known time/frequency slot, in which the other antennas are silent. The mobile phone thereby is able to estimate a channel response for each transmit/receive antenna pair, i.e. all combinations of transmit/receive antenna pairs, between the base station and the mobile phone. Each transmit/receive antenna pair corresponds to a certain precoder. Accordingly, the mobile phone may calculate its preferred precoder.

Information about the preferred precoder can also be used by the base station to estimate the direction to the receiver. If the reported preferred precoder changes with time, the base station can also detect movements of the mobile phone, which reported the preferred precoders.

In order to keep the number of reports of preferred precoders low, a selection of precoder choices is often limited. In this manner, a change in preferred precoder becomes more rare. A consequence thereof is that it is difficult to accurately estimate a movement of a single mobile phone.

In an exemplifying scenario, a group of users, each user carrying a respective mobile phone, are disembarked from a train and then the users head towards a parking lot. In this scenario, the use of precoders may enable improved performance if movement of the group relatively a base station serving the mobile phones of the users, a.k.a. group movement, may be detected. The precoders would then be set to follow the movement of the group. Other similar scenarios, include groups entering/leaving an event at a stadium, a concert in a concert hall or the like.

A problem in this regards may be how to efficiently detect group movement.

SUMMARY

An object may thus be to detect group movement in an efficient manner.

According to a first aspect, the object is achieved by a method, performed by a radio network node, for managing precoder reports from a set of user equipments served by the radio network node, wherein each of the precoder reports indicates a precoder selected, by a respective user equipment of the set of user equipments, to be used by the radio network node for transmission to the respective user equipment. The radio network node receives, in a first time interval, a first set of precoder reports from the set of user equipments. The radio network node receives, in a second time interval, a second set of precoder reports from the set of user equipments. The radio network node determines a first distribution of precoders for the set of user equipments and a second distribution of precoders for the set of user equipments, wherein the precoders in the first distribution are indicated by the first set of precoder reports and the precoders in the second distribution are indicated by the second set of precoder reports, whereby a change in distribution of precoders for the set of user equipments is detected, wherein the change indicates difference in distribution between the first time interval and the second time interval.

According to a second aspect, the object is achieved by a radio network node configured to manage precoder reports from a set of user equipments served by the radio network node, wherein each of the precoder reports indicates a precoder selected, by a respective user equipment of the set of user equipments, to be used by the radio network node for transmission to the respective user equipment. The radio network node is configured to receive, in a first time interval, a first set of precoder reports from the set of user equipments. The radio network node is configured to receive, in a second time interval, a second set of precoder reports from the set of user equipments. The radio network node is configured to determine a first distribution of precoders for the set of user equipments and a second distribution of precoders for the set of user equipments, wherein the precoders in the first distribution are indicated by the first set of precoder reports and the precoders in the second distribution are indicated by the second set of precoder reports, whereby a change in distribution of precoders for the set of user equipments is detectable, wherein the change indicates difference in distribution between the first time interval and the second time interval.

According to further aspects, the object is achieved by a computer program and a carrier for the computer program corresponding to the aspects above.

According to some embodiments herein, precoder reports are received and collected by the radio network node. The radio network node also determines a first and second distribution of the precoders for the set of user equipments, where the first distribution refers to distribution of precoders in the first time interval and the second distribution refers to distribution of precoders in the second time interval.

As an example, the radio network node may obtain an estimate of a first average radio direction, i.e. angle from antennas of the radio network node, for the set of user equipments in the first time interval. The average radio direction may thus be given by a direction calculates as a weighted mean value over respective directions corresponding to a respective precoder in the first distribution. Similarly, the radio network node may obtain an estimate of a second average radio direction. Thus, an estimate of the movement of the set of user equipments may be calculated.

An advantage is hence that efficient determination of group movements may be achieved, since only existing reports are used. This means that a load on a radio interface between the radio network node and the set of user equipments is maintained even though the radio network node provides further information in the form of the first and second distribution, which in turn may provide information about group movements.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Figure 1A:
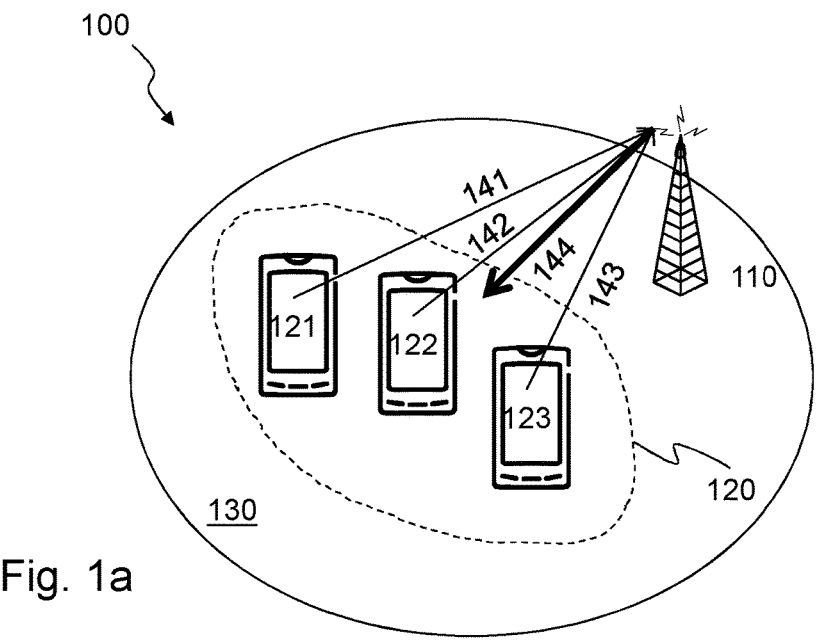
FIGS. 1a and 1b are schematic overviews of exemplifying wireless communication systems in which embodiments herein may be implemented.

As indicated in the background section, precoders can be used to estimate a position, or a direction, for a mobile phone.

In one such solution, referred to as a 'cycling phase shift solution' herein, a base station wraps, in an artificial manner, a phase shift of signals to antennas of the base station in a cyclic manner. In this fashion, statistics for when a preferred precoder changes, is obtained. Since the mobile phone reports the preferred precoder, the position, or at least the angular direction given by the precoder, for the mobile phone can be estimated. When the phase shift is cycled for different points in time, accuracy of the estimated position may be improved beyond granularity of the reported preferred precoder, since the artificial cycling provides additional phase shifts which are known to the base station. A mobility pattern can be obtained by doing this repeatedly for different moments in time. A problem with this solution is that it may take a lot of time to estimate the mobility patterns for a group of mobile phones, or group of users. This also means that considerable amounts of resources in the base station may be consumed while performing such estimates of mobility patterns for the group of mobile phones.

Throughout the following description similar reference numerals have been used to denote similar features, such as nodes, actions, steps, modules, circuits, parts, items elements, units or the like, when applicable. In the Figures, features that appear in some embodiments are indicated by dashed lines.

FIG. 1a depicts an exemplifying wireless communication system 100 in which embodiments herein may be implemented. In this example, the wireless communication system 100 is a Long Term Evolution (LTE) network. In other examples, the wireless communication network 100 may be any cellular or wireless communication system, such as a Global System for Mobile Communications (GSM), Universal Mobile Telecommunication System (UMTS) and Worldwide Interoperability for Microwave Access (WiMAX) or the like.

The wireless communication system 100 may be said to comprise a radio network node 110. As used herein, the term "radio network node" may refer to an evolved Node B (eNB), a Radio Network Controller (RNC), a Radio Base Station (RBS), a Base Station Controller (BSC), a base station, a node controlling one or more Remote Radio Units (RRUs), an access point, a relay node, a repeater node or the like.

Furthermore, the wireless communication system 110 may be said to comprise a set of user equipments 120. The set of user equipments 120 may comprises one or more user equipments, such as a first user equipment 121, a second user equipment 122 and a third user equipment 123.

The radio network node 110 may operate a cell 130 by which the set of user equipments 120 may be served. This may mean that each user equipment of the set of user equipments 120 may be located in the cell 130.

The first user equipment 121 may communicate 141, e.g. send precoder reports to, with the radio network node 110. This communication may include user transmissions and/or control transmissions. The user transmissions may include user data, payload data, content data etc. The control transmissions may include control information relating to e.g. scheduling, authentication, mobility etc.

Similarly, the second user equipment 122 may communicate 142, e.g. send precoder reports to, with the radio network node 110. This communication may include user transmissions and/or control transmissions. The user transmissions may include user data, payload data, content data etc. The control transmissions may include control information relating to e.g. scheduling, authentication, mobility etc.

Additionally, the third user equipment 123 may communicate 143, e.g. send precoder reports to, with the radio network node 110. This communication may include user transmissions and/or control transmissions. The user transmissions may include user data, payload data, content data etc. The control transmissions may include control information relating to e.g. scheduling, authentication, mobility etc.

The set of user equipments 120, which may be referred to as a group of user equipments in case there are two or more user equipments in the set, is located in a direction 144, e.g. with respect to an antenna of the radio network node 110. The direction 144 may be an average radio direction for the set of user equipments 120, e.g. in a first time interval relating to FIG. 1a. The first time interval may e.g. be 30 s, 60 s or the like as appropriate for a particular application.

As used herein, the term "user equipment" may refer to a wireless device, a machine-to-machine (M2M) device, a mobile phone, a cellular phone, a Personal Digital Assistant (PDA) equipped with radio communication capabilities, a smartphone, a laptop or personal computer (PC) equipped with an internal or external mobile broadband modem, a tablet PC with radio communication capabilities, a portable electronic radio communication device, a sensor device equipped with radio communication capabilities or the like. The sensor may be any kind of weather sensor, such as wind, temperature, air pressure, humidity etc. As further examples, the sensor may be a light sensor, an electronic or electric switch, a microphone, a loudspeaker, a camera sensor etc. The term "user" may indirectly refer to the user equipment or the wireless device.

Figure 1B:
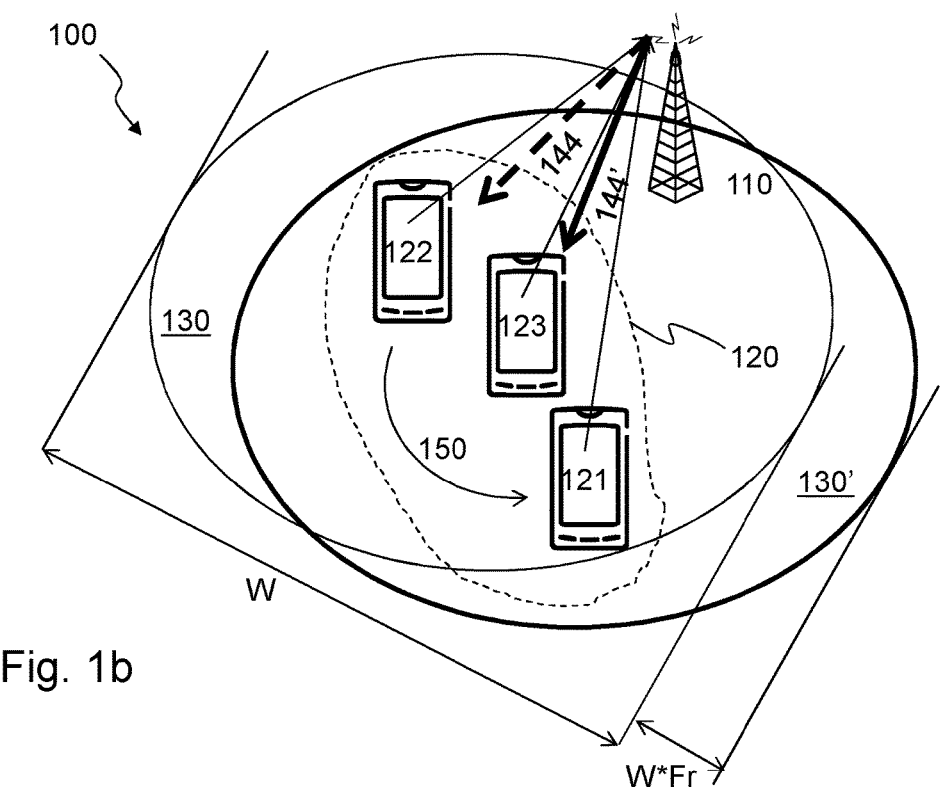

FIG. 1b depicts the wireless communication system 100 of FIG. 1a after the first user equipment 121 has moved 150 within the cell 130. When the first user equipment 121 has moved it has the consequence of changing direction for the set of user equipments 120 towards the radio network node 110. Thus, the set of user equipments 120 are now located in a further direction 144', e.g. with respect to an antenna of the radio network node 110. The further direction 144' may be an average radio direction for the set of user equipments 120, e.g. in a second time interval relating to FIG. 1b. The second time interval may e.g. be 30 s, 60 s or the like as appropriate for a particular application.

In this scenario, it may be beneficial, e.g. in view of coverage and throughput, for the radio network node 110 to provide a cell 130', e.g. a modification of the cell 130.

A width W of the cell 130 and a fraction Fr is discussed in its appropriate context below.

It will in the following description be explained how a change of the direction 144 to the further direction 144' may be detected by user of precoder statistics received from the set of user equipments 120.

In one exemplifying embodiment, it is shown how the change of direction may be used to adjust, or adapt, the cell 130 to match a movement of the set of user equipments 120. A group movement may be indicated by the change of direction. Consequently, a cell 130' illustrates how the cell 130 may be adjusted, or matched to the movement.

Figure 2:
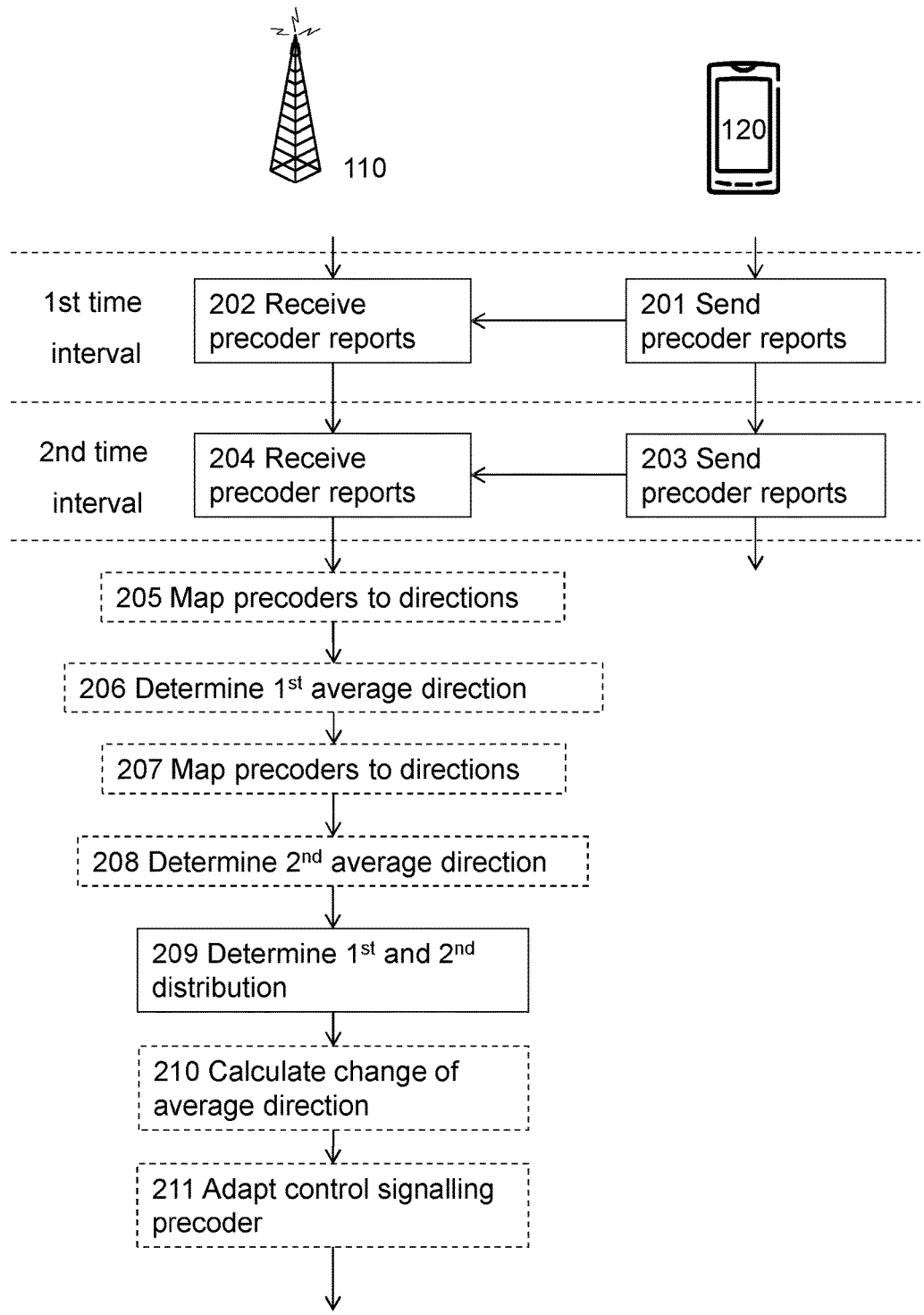
FIG. 2 is a combined signaling and flowchart illustrating the methods herein.

FIG. 2 illustrates an exemplifying method according to embodiments herein when implemented in the wireless communication system 100 of FIG. 1. The radio network node 110 performs a method for managing precoder reports from a set of user equipments 120 served by the radio network node 110.

Each of the precoder reports indicates a precoder selected, by a respective user equipment 121, 122, 123 of the set of user equipments 120, to be used by the radio network node 110 for transmission to the respective user equipment 120. This may mean that each respective user equipment 121, 122, 123 provides a respective precoder report which indicates a respective precoder corresponding to a choice made by said each respective user equipment 121, 122, 123.

The following actions may be performed in any suitable order. Some actions may be omitted as indicated by the wording "may".

Initially, the radio network node 110 may have detected that the set of user equipments 120 is large enough. For example, the radio network node 110 may be detected that the set of user equipments 120 includes a number of user equipments that is greater than a threshold value. The threshold value may indicate when the number of user equipments in the set of user equipment 120 is great enough to trigger activation of the method below, e.g. to allow the method below to be performed. A reason for this may be that accuracy of the method herein may be poor when the number of user equipments is small, e.g. less than the threshold value. The threshold value may be 20, 50, 100, 200, 1000 or any other value that may be empirically found by tests for a particular wireless communication system and its set up.

ACTION 201

In order to inform the radio network node 110 about preferred precoder, the set of user equipments 120 sends a first set of precoder reports to the radio network node 110.

ACTION 202

Subsequent to action 201, the radio network node 110 receives, in the first time interval, the first set of precoder reports from the set of user equipments 120. In this action, the radio network node 110 may thus collect and store the precoders indicated by the first set of precoder reports.

In an example, the radio network node 110 may store a respective user identification relating to the respective precoder report. The respective user identification may be International Mobile Subscriber Identity (IMSI) or the like. The user identification may be used by the radio network node 110 in order to keep track of which user equipment reported a particular precoder given by one of the reports in the first set of precoder reports.

ACTION 203

In the second time interval, in order to inform the radio network node 110 about preferred precoder, the set of user equipments 120 sends a second set of precoder reports to the radio network node 110.

ACTION 204

Subsequent to action 203, the radio network node 110 receives, in a second time interval, the second set of precoder reports from the set of user equipments 120. In this action, the radio network node 110 may thus collect and store the precoders indicated by the second set of precoder reports.

Again, as in action 202, the radio network node 110 may store and use the respective user identification to keep track of the respective user equipment that reported the respective precoder.

ACTION 205

When action 202 has been performed, the radio network node 110 may, for each received precoder report in the first time interval, map each respective precoder, indicated by said each received precoder report in the first time interval, to a respective direction towards the respective user equipment 120. The respective direction may be given relatively a reference direction, or a main direction, of the antennas of the radio network node 110. The reference direction may for example refer to when phase shift to each antenna of the radio network node is the same, e.g. zero or other value.

ACTION 206

After action 205, the radio network node 110 may determine a first average direction for the set of user equipments 120 in the first time interval based on the respective directions.

ACTION 207

When action 204 has been performed, the radio network node 110 may, for each received precoder report in the second time interval, map each respective precoder, indicated by said each received precoder report in the second time interval, to a respective direction towards the respective user equipment 120.

ACTION 208

After action 207, the radio network node 110 may determine a second average direction for the set of user equipments 120 in the second time interval based on the respective directions.

ACTION 209

The radio network node 110 determines a first distribution of precoders for the set of user equipments and a second distribution of precoders for the set of user equipments. The precoders in the first distribution are indicated by the first set of precoder reports and the precoders in the second distribution are indicated by the second set of precoder reports. In this manner, a change in distribution of precoders for the set of user equipments 120 is detected. The change indicates difference in distribution between the first time interval and the second time interval. Since the first and second distribution may be associated to a respective precoder, e.g. expressed as a direction, a movement of the set of user equipments may be detected.

As an example, the precoders may be represented by precoder indices, e.g. 1, 2, . . . , n], where n is the index of the last precoder and the number of precoder in total. The radio network node 110 may determine the first distribution by counting, among the precoders in the first set of reports, number of precoders with index 1, number of precoders with index 2 and so on up until number of precoders with index n. The result of the counting may be expressed as a vector of length n, where indices to posts, or positions, in the vector are the precoder indices. Here, indices of post thus range from 1 to n, in computer programming indices of vectors may range from zero to n−1. Assume that the result of the counting is that 3 precoders with index 1, 2 precoders with index 3 were found, no other precoders were reported. Also assume that there are only 5 different precoders, i.e. n=5. The vector is thus [3 0 3 0 0], which has a length of 5. In a similar manner, the radio network node 110 may determine the second distribution by counting precoders in the second time interval, e.g. a vector of [0 3 0 3 0] may be calculated. In this example, an average precoder in the first time interval has index 2 and an average precoder in the second time interval has index 3. In this example, it is assumed that the indices of the precoders are given in order according to the directions of the precoders. However, in many examples this is not the case. When it is not the case, a mapping of precoder index to a direction index representing a direction may be performed by the radio network node 110. After such mapping may have been performed, the radio network node 110 may instead count number of direction indices. Then, the example continues similarly to the above. This example continues in action 211.

An advantage, in particular in view of the cycling phase shift solution mentioned initially in section detailed description, is thus that there is no need for artificial phase wrapping.

Thanks to that the present embodiments may provide a solution for detection of movement of the set of user equipments without first detecting movement of each individual user equipment 121, 122, 123, the embodiments herein are less costly that other known solution which first determine movement of each individual user equipment 121, 122, 123.

A further advantage of the embodiments herein is that as number of user equipments of the set of user equipments increase, accuracy in determination of the change in distribution of precoders increases, while computational complexity does not increase significantly. This is in contrast to the known solutions which first determine movement of each individual user equipment 121, 122, 123. For these known solutions, computational complexity would increase with number of precoders.

ACTION 210

When actions 206 and 208, the radio network node 110 may calculate a change of average direction based on a difference between the first and second average directions.

In some examples, action 210 may also be performed when action 209 has been performed, but not action 206 and 208. In these examples, the first and second average directions are expressed by respective average precoders. Then, the change of average direction is calculated from a difference between the respective average precoders by mapping different in precoder to direction, e.g. angle.

ACTION 211

The radio network node 110 may adapt a control signalling precoder used for control signalling in the cell 130, 130' based on the change in distribution. This may mean that the radio network node 110 may replace a current control signalling precoder with a further control signalling precoder, where the further control signalling precoder is determined based on the change in distribution.

The change in distribution may only reflect distribution of precoders. This may mean that there will be no change in distribution when e.g. the first and second user equipments 121, 122 changes position with each other.

In a further example, the control signalling in the cell 130, 130' may be adapted by that the antenna of the radio network node 110 is physically moved, or turned, to point in the second average direction. Expressed differently, the antenna may be revolved to point in the second average direction.

Continuing with the example from action 209, the change in distribution between the first and second time intervals may be expressed as that an index of average precoder for the set of user equipments is increased by 1, which may correspond to a movement of the set of user equipments to the right or left with respect to a current control signalling precoder average precoder in the first time interval. Thus, for example, if the current control signalling precoder has index 1, then the further control signalling precoder obtains index 2, i.e. 1+1. The further control signal precoder is thus an adapted control signalling precoder. In other examples, the adapted control signalling precoder may obtain index 3, which is equal to the average precoder in the second time interval as mentioned above.

Controlling signalling may refer to signals at radio resources dedicated for control signals like reference signals, scheduling commands, configuration messages etc. The radio resources may refer to subcarriers, subframes, physical or logical channels, Physical Resource Blocks or the like. As opposed to the control signalling, data signalling refers to radio resources dedicated for data signals carrying payload data, such as voice, data traffic, streaming etc. The precoder reports received, e.g. in action 202 and 204, by the radio network node 110 relates to precoders to be used for data transmission, e.g. to each individual user equipment 121, 122, 123.

In an example of action 211, the radio network node 110 may adapt the control signalling precoder used for control signalling in the cell 130, 130' based on the second distribution only. In this case, an absolute cell shaping is performed. This means that the shape of the cell is adapted, e.g. by precoder selection, physical movement of the antenna etc, to an absolute direction given by the second distribution.

Now a description of one particular example of the method herein is presented. This particular embodiment is similar to the embodiment of FIG. 2, but differs in how "time interval" is defined. A present precoder report arrives, from a user, i.e. any one of the user equipments 121, 122, 123, at the radio network node 110, which stores a user ID, referred to as user identification above, an arrival time and a precoder choice indicated by the present precoder report. See also actions 202 and/or 204.

The radio network node 110 may set a time interval to a fixed value, such as 30 s, 60 s, or the like. In some examples, the time interval may be dynamically determined. In this manner, a more flexible method, e.g. in terms of processing power required, may be obtained.

Next, the radio network node 110 checks by reviewing any existing previous precoder reports, if the same user has reported another precoder. The radio network node 110 considers a particular precoder report to be part of said any existing previous precoder reports if the particular precoder report was received after the beginning of a current laps of the time interval. If the same user has report another precoder, then the radio network node 110 notes the precoders that the user has changed between and a respective point in time at which the precoders were reported. The radio network node 110 also makes an estimate of a point in time at which the change of precoders was performed, e.g. the estimate may be given by an average of the respective points in time at which the precoders were reported. In this manner, the radio network node 110 may keep track of precoder shifts to the right or left and at what points in time these precoder shifts occurred.

Then, e.g. once per each expiry of the time interval, the radio network node 110 notes a number U of different users, i.e. user IDs, that has reported any precoder in the time interval. See also action 209.

Furthermore, the radio network node 110 checks a number of users Ur that has reported a precoder shift representing a right movement within the time interval. Additionally, the radio network node 110 checks a number of users Ul that has reported a precoder shift representing a left movement within the time interval. In this example, only right of left movement is considered. In a more detailed example, an amount of the movement to the left or right may also be considered. See also action 209.

Now, the radio network node 110 calculates a fraction Fr of users that has moved to the right, Fr=(Ur-Ul)/U. See also action 210.

Then, the radio network node 110 may perform make cell shaping by adjusting a precoder used for control signalling, e.g. control channels and the like, such that a coverage area of the cell 130 is moved to the right with the fraction Fr of a width W of the cell 130. As indicated in FIG. 1b, the cell 130 is moved a distance W*Fr, i.e. becoming the cell 130'. See also action 211.

The embodiments described herein may be combined with known solution for estimating radial distance between each of the user equipments 121, 122, 123 and the radio network node 110, In this manner, a movement pattern of the set of user equipments 120 may be obtained.

Figure 3:
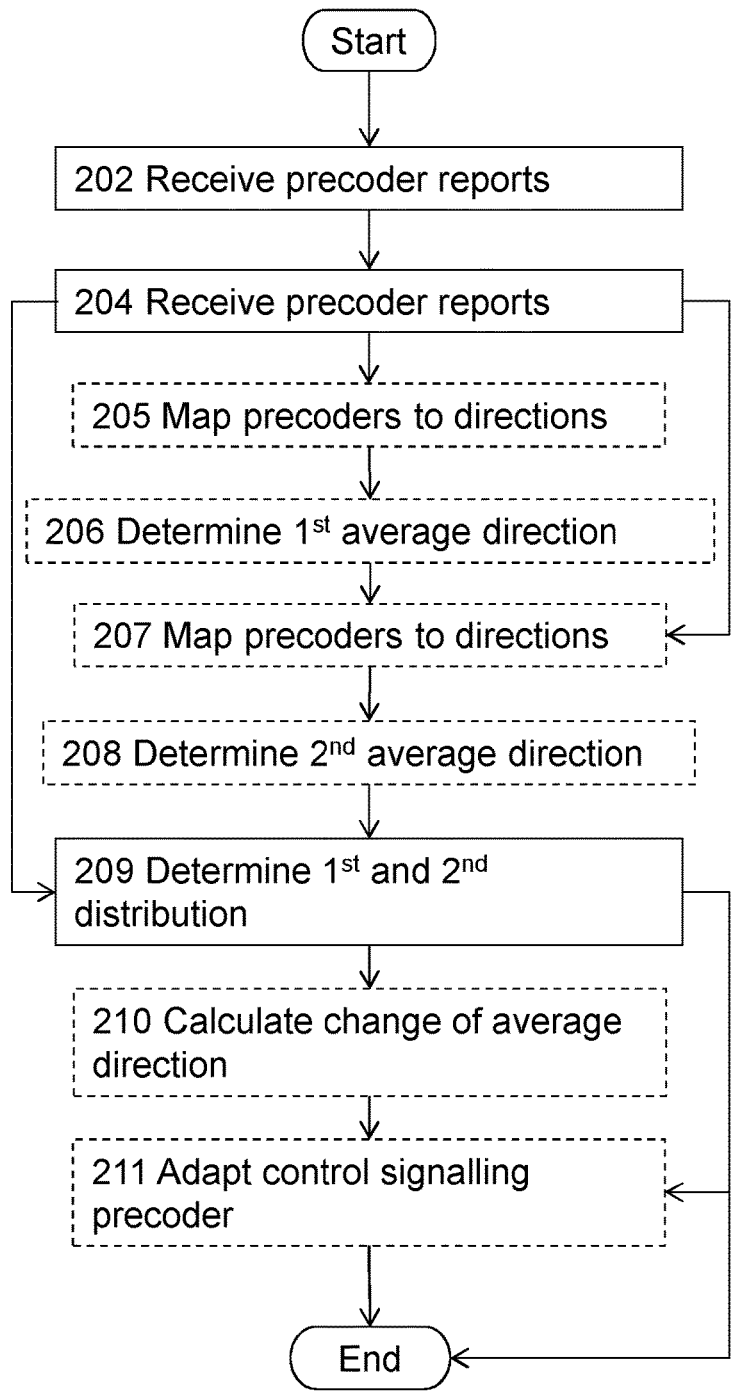
FIG. 3 is a flowchart illustrating embodiments of the method in the radio network node.

In FIG. 3, a schematic flowchart of exemplifying methods in the radio network node 110 is shown. The same reference numerals as above have been used to denote the same or similar features, in particular the same reference numerals have been used to denote the same or similar actions. Accordingly, the radio network node 110 performs a method for managing precoder reports from a set of user equipments 120 served by the radio network node 110.

As mentioned, each of the precoder reports indicates a precoder selected, by a respective user equipment 120 of the set of user equipments 120, to be used by the radio network node 110 for transmission to the respective user equipment 120.

The following actions may be performed in any suitable order. Some actions may be omitted as indicated by the wording "may".

ACTION 202

The radio network node 110 receives 202, in a first time interval, a first set of precoder reports from the set of user equipments 120;

ACTION 204

The radio network node 110 receives 204, in a second time interval, a second set of precoder reports from the set of user equipments 120.

ACTION 205

The radio network node 110 may, for each received precoder report in the first time interval, map each respective precoder, indicated by said each received precoder report in the first time interval, to a respective direction towards the respective user equipment 120.

ACTION 206

The radio network node 110 may determine a first average direction for the set of user equipments 120 in the first time interval based on the respective directions.

ACTION 207

The radio network node 110 may, for each received precoder report in the second time interval, map each respective precoder, indicated by said each received precoder report in the second time interval, to a respective direction towards the respective user equipment 120.

ACTION 208

The radio network node 110 may determine a second average direction for the set of user equipments 120 in the second time interval based on the respective directions.

ACTION 209

The radio network node 110 determines a first distribution of precoders for the set of user equipments and a second distribution of precoders for the set of user equipments, wherein the precoders in the first distribution are indicated by the first set of precoder reports and the precoders in the second distribution are indicated by the second set of precoder reports, whereby a change in distribution of precoders for the set of user equipments 120 is detected, wherein the change indicates difference in distribution between the first time interval and the second time interval.

ACTION 210

The radio network node 110 may operate a cell 130 by which the set of user equipments 120 may be served.

The radio network node 110 may calculate a change of average direction based on a difference between the first and second average directions.

ACTION 211

The radio network node 110 may adapt a control signalling precoder used for control signalling in the cell based on the change in distribution.

Figure 4:
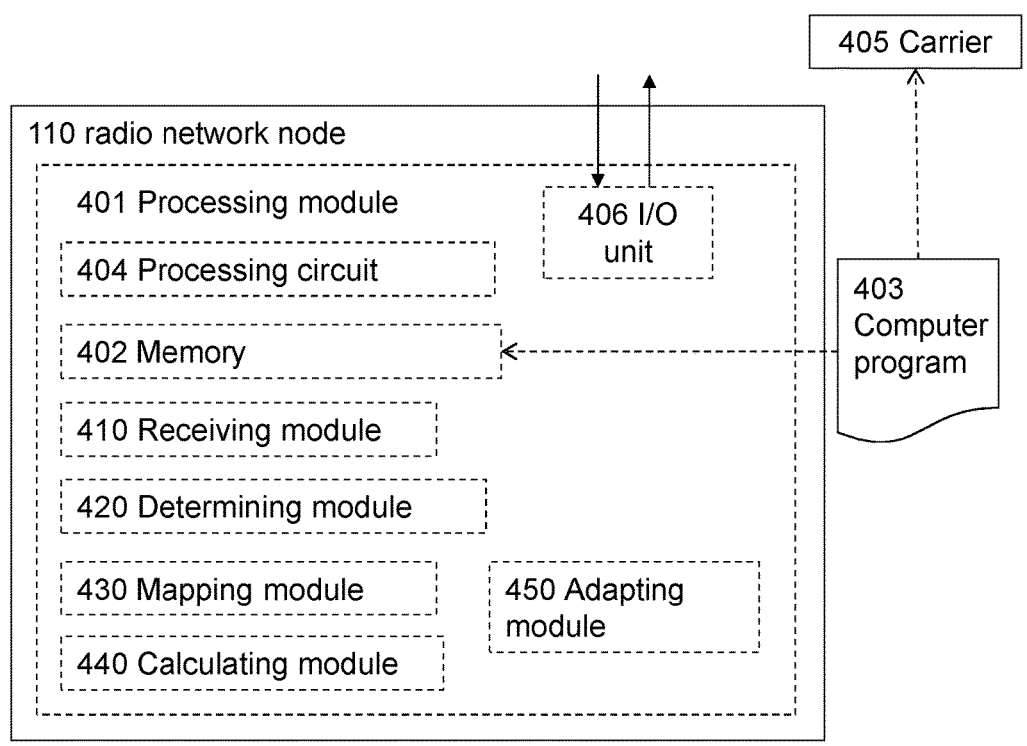
FIG. 4 is a block diagram illustrating embodiments of the radio network node.

With reference to FIG. 4, a schematic block diagram of embodiments of the radio network node 110 of FIG. 1 is shown. The radio network node 110 is thus configured to manage precoder reports from a set of user equipments 120 served by the radio network node 110.

As mentioned, each of the precoder reports indicates a precoder selected, by a respective user equipment 120 of the set of user equipments 120, to be used by the radio network node 110 for transmission to the respective user equipment 120.

The radio network node 110 may comprise a processing module 401, such as a means, one or more hardware modules and/or one or more software modules for performing the methods described herein.

The radio network node 110 may further comprise a memory 402. The memory may comprise, such as contain or store, a computer program 403.

According to some embodiments herein, the processing module 401 comprises, e.g. 'is embodied in the form of' or 'realized by', a processing circuit 404 as an exemplifying hardware module. In these embodiments, the memory 402 may comprise the computer program 403, comprising computer readable code units executable by the processing circuit 404, whereby the radio network node 110 is operative to perform the methods of FIG. 2 and/or FIG. 3.

In some other embodiments, the computer readable code units may cause the radio network node 110 to perform the method according to FIGS. 2 and/or 3 when the computer readable code units are executed by the radio network node 110.

FIG. 4 further illustrates a carrier 405, comprising the computer program 403 as described directly above. The carrier 405 may be one of an electronic signal, an optical signal, a radio signal, and a computer readable medium.

In some embodiments, the processing module 401 comprises an Input/Output unit 406, which may be exemplified by a receiving module and/or a sending module as described below when applicable.

In further embodiments, the processing module 401 may comprise one or more of a receiving module 410, a determining module 420, mapping module 430, a calculating module 440 and an adapting module 450 as exemplifying hardware modules. In other examples, one or more of the aforementioned exemplifying hardware modules may be implemented as one or more software modules.

Therefore, according to the various embodiments described above, the radio network node 110 is operative to and/or the radio network node 110, the processing module 401 and/or the receiving module 410 is configured to receive, in a first time interval, a first set of precoder reports from the set of user equipments 120.

Moreover, the radio network node 110 is operative to and/or the radio network node 110, the processing module 401 and/or the receiving module 410, or a further receiving module (not shown), is configured to receive, in a second time interval, a second set of precoder reports from the set of user equipments 120.

The radio network node 110 is operative to and/or the radio network node 110, the processing module 401 and/or the determining module 420 is configured to determine a first distribution of precoders for the set of user equipments and a second distribution of precoders for the set of user equipments, wherein the precoders in the first distribution are indicated by the first set of precoder reports and the precoders in the second distribution are indicated by the second set of precoder reports, whereby a change in distribution of precoders for the set of user equipments 120 is detectable, wherein the change indicates difference in distribution between the first time interval and the second time interval.

The radio network node 110 may be operative to and/or the radio network node 110, the processing module 401 and/or the determining module 420, or a further determining module (not shown), may be configured to determine a first average direction for the set of user equipments 120 in the first time interval based on the respective directions.

The radio network node 110 may be operative to and/or the radio network node 110, the processing module 401 and/or the determining module 420, or another determining module (not shown), may be configured to determine a second average direction for the set of user equipments 120 in the second time interval based on the respective directions.

The radio network node 110 may be operative to and/or the radio network node 110, the processing module 401 and/or the mapping module 430 may be configured to, for each received precoder report in the first time interval, map each respective precoder, indicated by said each received precoder report in the first time interval, to a respective direction towards the respective user equipment 120.

The radio network node 110 may be operative to and/or the radio network node 110, the processing module 401 and/or the mapping module 430, or a further mapping module (not shown), may be configured to, for each received precoder report in the second time interval, map each respective precoder, indicated by said each received precoder report in the second time interval, to a respective direction towards the respective user equipment 120.

The radio network node 110 may be operative to and/or the radio network node 110, the processing module 401 and/or the calculating module 440 may be configured to calculate a change of average direction based on a difference between the first and second average directions.

In some embodiments, the radio network node 110 may be configured to operate a cell 130 by which the set of user equipments 120 are servable. The radio network node 110 may be operative to and/or the radio network node 110, the processing module 401 and/or the adapting module 450 may be configured to adapt a control signalling precoder used for control signalling in the cell based on the change in distribution.

As used herein, the term "node" may refer to one or more physical entities, such as devices, apparatuses, computers, servers or the like. This may mean that embodiments herein may be implemented in one physical entity. Alternatively, the embodiments herein may be implemented in a plurality of physical entities, such as an arrangement comprising said one or more physical entities, i.e. the embodiments are implemented in a distributed manner.

As used herein, the term "processing module" may include one or more hardware modules, one or more software modules or a combination thereof. Any such module, be it a hardware, software or a combined hardware-software module, may be a determining means, estimating means, capturing means, associating means, comparing means, identification means, selecting means, receiving means, sending means or the like as disclosed herein. As an example, the expression "means" may be a module corresponding to the modules listed above in conjunction with the Figures.

As used herein, the term "processing circuit" may refer to a processing unit, a processor, an Application Specific integrated Circuit (ASIC), a Field-Programmable Gate Array (FPGA) or the like. The processing circuit or the like may comprise one or more processor kernels.

As used herein, the expression "configured to" may mean that a processing circuit is configured to, or adapted to, by means of software configuration and/or hardware configuration, perform one or more of the actions described herein.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), etc.

As used herein, the term "computer readable code units" may be text of a computer program, parts of or an entire binary file representing a computer program in a compiled format or anything there between.

As used herein, the term "radio resource" may refer to a certain coding of a signal and/or a time frame and/or a frequency range in which the signal is transmitted. In some examples, a resource may refer to one or more Physical Resource Blocks (PRB) which is used when transmitting the signal. In more detail, a PRB may be in the form of Orthogonal Frequency Division Multiplexing (OFDM) PHY resource blocks (PRB). The term "physical resource block" is known from 3GPP terminology relating to e.g. Long Term Evolution Systems.

As used herein, the terms "number" and/or "value" may be any kind of digit, such as binary, real, imaginary or rational number or the like. Moreover, "number" and/or "value" may be one or more characters, such as a letter or a string of letters. "Number" and/or "value" may also be represented by a bit string.

As used herein, the term "set of", such as set of devices, may refer to one or more of something. E.g. a set of devices may refer to one or more devices, a set of parameters may refer to one or more parameters or the like according to the embodiments herein.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, performed by a radio network node, for managing precoder reports from a set of user equipments served by the radio network node, wherein each of the precoder reports indicates a precoder selected, by a respective user equipment of the set of user equipments, to be used by the radio network node for transmission to the respective user equipment, wherein the method comprises:
   receiving, in a first time interval, a first set of precoder reports from the set of user equipments;
   receiving, in a second time interval, a second set of precoder reports from the set of user equipments;
   determining a first distribution of precoders for the set of user equipments and a second distribution of precoders for the set of user equipments, wherein the precoders in the first distribution are indicated by the first set of precoder reports and the precoders in the second distribution are indicated by the second set of precoder reports, whereby a change in distribution of precoders for the set of user equipments is detected, wherein the change indicates difference in distribution between the first time interval and the second time interval;
   for each received precoder report in the first time interval, mapping each respective precoder, indicated by said received precoder report in the first time interval, to a respective direction towards the respective user equipment; and
   determining a first average direction for the set of user equipments in the first time interval based on the respective directions; and wherein the method comprises:
   for each received precoder report in the second time interval, mapping each respective precoder, indicated by said each received precoder report in the second time interval, to a respective direction towards the respective user equipment; and
   determining a second average direction for the set of user equipments in the second time interval based on the respective directions.

2. The method according to claim 1, wherein the radio network node operates a cell by which the set of user equipments are served, wherein the method comprises:
   adapting a control signalling precoder used for control signalling in the cell based on the change in distribution.

3. The method according to claim 1, wherein the method comprises:
   calculating a change of average direction based on a difference between the first and second average directions.

4. A radio network node configured to manage precoder reports from a set of user equipments served by the radio network node, wherein each of the precoder reports indicates a precoder selected, by a respective user equipment of the set of user equipments, to be used by the radio network node for transmission to the respective user equipment, wherein the radio network node is configured to:
   receive, in a first time interval, a first set of precoder reports from the set of user equipments;
   receive, in a second time interval, a second set of precoder reports from the set of user equipments;
   determine a first distribution of precoders for the set of user equipments and a second distribution of precoders for the set of user equipments, wherein the precoders in the first distribution are indicated by the first set of precoder reports and the precoders in the second distribution are indicated by the second set of precoder reports, whereby a change in distribution of precoders for the set of user equipments is detectable, wherein the change indicates difference in distribution between the first time interval and the second time interval;
   for each received precoder report in the first time interval, map each respective precoder, indicated by said each received precoder report in the first time interval, to a respective direction towards the respective user equipment; and determine a first average direction for the set of user equipments in the first time interval based on the respective directions; and wherein the radio network node is configured to:

for each received precoder report in the second time interval, map each respective precoder, indicated by said each received precoder report in the second time interval, to a respective direction towards the respective user equipment; and determine a second average direction for the set of user equipments in the second time interval based on the respective directions; and wherein the radio network node is configured to calculate a change of average direction on a difference between the first and second average directions.

5. The radio network node according to claim 4, wherein the radio network node is configured to operate a cell by which the set of user equipments are servable, wherein the radio network node is configured to adapt a control signalling precoder used for control signalling in the cell based on the change in distribution.

6. A non-transitory computer readable medium comprising: a computer program, the computer program comprising computer readable code units which when executed on a radio network node causes the radio network node to perform the method according to claim 1.

* * * * *